United States Patent Office 3,600,269
Patented Aug. 17, 1971

3,600,269
NOVEL FIBER REINFORCED MATRIX COMPOSITES
Brian K. Daniels, Jack Preston, and David A. Zaukelies, Raleigh, N.C., assignors to Monsanto Company, St. Louis, Mo.
Filed July 29, 1968, Ser. No. 748,559
Int. Cl. B32b 27/02, 27/12, 27/34
U.S. Cl. 161—170
26 Claims

ABSTRACT OF THE DISCLOSURE

Resinous and ceramic shaped structures have been reinforced with high temperature organic fibers having densities greater than 1.37 g./ml. and unusually high initial moduli of over 700 grams per denier at elongations of 2 percent or greater. The reinforcing fiber elements are made from wholly aromatic polymers having melting points above 200° C. and inherent viscosities of at least 3.5. The fiber reinforced composites are used for shaped structures having modulus/unit weight properties superior to those of comparable glass reinforced structures.

---

The recent successes of glass and graphite fiber reinforced composites have brought about widespread changes with respect to basic design and construction capabilities. Many design and construction elements previously limited to metals, concrete and other conventional materials can now be replaced by strong, lightweight glass and graphite fiber reinforced plastic materials which can be tailored to achieve modulus per unit weight with versatility of design and ease of fabrication exceeding that found through the use of conventional materials. The desirable properties of glass and graphite fibers which make them useful as reinforcing elements in plastic composite materials are their relatively lightweight and high modulus properties which have very greatly exceeded modulus properties heretofore achieved in fibers made from organic polymer. "E" glass and, even more recently, "S" glass and graphite fibers because of their high modulus properties and resistance to heat have found wide application and use, as reinforcing elements for a wide range of organic resins, notwithstanding certain inherent drawbacks and limitations with respect to their use.

In this respect there appears to obtain a certain degree of incompatibility between graphite or glass fibers and the organic resin matrices in which they are embedded as reinforcing elements. This incompatibility results in poor bonding between the resin and the fiber and thereby can greatly reduce the efficiency of performance of the composite.

This drawback in many cases can be largely reduced through the use of frequently expensive and complex bonding or coupling agents to enhance the bond at the fiber/matrix interface. Glass and graphite fibers are quite brittle and necessitate careful handling not only in their preparation but in their use in the fabrication of shaped composite structures. Aside from preparation and fabrication using glass and graphite fibers, their brittle quality tends to render their impact resistance to be less than is desirable for many end uses. Moreover, glass fibers appear to possess an inherent water sensitivity which limits its effective use under conditions which cause fiber wetting.

The principal object of this invention lies in the provision of novel lightweight materials.

It is another object of this invention to provide novel composite structures of resinous and ceramic materials having enhanced modulus per unit weight properties.

A further object of the invention herein described lies in the provision of high modulus fiber reinforced resin and ceramic composite structures.

A still further object of the invention is the provision of high modulus organic fiber reinforced composite structures wherein the fiber reinforcement is highly efficient.

These and other objects of the invention are accomplished by reinforcing resinous and ceramic matrices with organic fibers having unusually high initial modulus values in combination with other desirable properties hereinafter described in greater detail.

Until the invention described herein, composite structures made from organic fibers have not been made having properties of modulus at reasonable elongation values which could approach the properties of "S" glass, for example. Polyester tire cord traditionally considered to be a high modulus synthetic organic fiber possesses tensile properties far below that of "S" glass reinforcing agents.

Through the use of a particular class of organic polymers which possess certain interrelated chemical and physical features and by achieving efficient molecular packing through high stretch orientation in the preparation of fibers from these polymers, it has been discovered that certain organic fibers can be made having modulus values much greater than "S" glass. Moreover, the use in composite structures of high modulus fibers of these organic polymers appears to result in greater compatibility between fiber and resinous matrices than found in the case of glass fibers. Additionally, the fiber reinforcing elements of this invention are extremely moisture resistant and maintain their excellent tensile properties at moderately high temperatures.

The organic fibers employed in this invention have densities above 1.37, single filament elongation-to-break ($E_b$) values ranging from 2 to 15 percent and an initial modulus, in grams per denier, greater than the value, $1000(E_b^{-0.58})$ where ($E_b$) is expressed in percent here and elsewhere hereinafter. To obtain such properties these fibers must be prepared from essentially linear organic polymers which do not melt at temperatures below 200° C. and possess inherent viscosities greater than 3.5 when measured in a suitable solvent.

Figure 1:
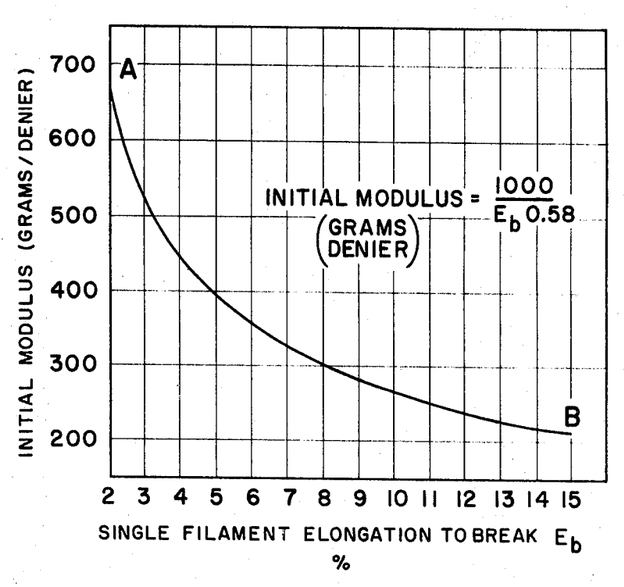

The value, $1000(E_b^{-0.58})$, wherein the single filament elongation-to-break ($E_b$) lies between 2.0 and 15 percent constitutes the slope of the curve AB on the graph in FIG. 1. Thus, the family of fibers employed in the instant invention must possess initial moduli of greater than about 210 at 15 percent elongation-to-break and an initial moduli of greater than about 700 at 2 percent elongation. These extraordinary properties are unique for high temperature, high density organic fibers and provide a versatility of property relationships within the above-indicated limits which have not heretofore been approached by modern science.

The class of polymers capable of being spun into the high modulus fibers used in this invention are wholly aromatic linear polymers which provide rigid chains such that the ability for the polymer chain to fold, rotate in random coil or irregular fashion is minimized. That is, it is essential that there must be little irregular molecular spin along the chain so that the oriented molecules in the fiber form are capable of packing to the extent that fiber densities of 1.37 or greater can be achieved. Efficient or close molecular packing, reflected by the fiber density is essential to the achievement of the greatly superior and unique combination of properties possessed by the fibers of this invention. To insure rigidity along the polymer chain, the recurring divalent aromatic radical along the polymer chain must have centers of symmetry, as in the case of 1,5-naphthylene, 2,6-naphthylene, and 4,4'-biphenylene, or simply be all para oriented, or they may be a combination of para oriented aromatic radicals along with other aromatic radicals having centers of symmetry.

Another essential feature of this class of polymers is that the recurring aromatic radicals along the polymer chain must be linked in the chain through carbocyclic carbon atoms to one of —NH— or —N=N— radicals. These interlinking groups and combinations of them, such as to the exclusion of those radicals which allow the polymer chains to fold, bend or otherwise penetrate the circumference of the theoretical cylinder formed by the orbital molecular rotation of molecules in a rigid chain polymer, are essential to the achievement of superior fiber properties. We have also found that the above-described aromatic radicals may be linked in the polymer chain, without disruption of chain rigidity, by single or multiple ring aromatic heterocyclic radicals which do not allow the chain to bend or fold as reflected by fibers prepared therefrom having densities greater than 1.37.

The aromatic heterocyclic radicals which may be present in the wholly aromatic polymers are unsubstituted 5 and 6 membered rings containing only the C, O, S and N. In order to maintain the chain rigidity necessary for this invention the heterocyclic radicals must contain at least two extracyclic interlinear covalent bonds which are non-adjacent with respect to the cyclic atoms of the ring. Additionally, at least two extracyclic interlinear covalent bonds must be oriented with respect to one another at maximum spacing. These requirements apply with respect to the single rings in the case of a multi-ring system. Exemplary of such ring systems are the following radicals:

Thus, the key to the orientation of the carbocyclic or heterocyclic radicals which may form links in the polymer chains is that the covalent bond at one end of a given radical must be that which is the greatest distance possible from the other bond or bonds linking the radical in the polymer chains.

In addition to the chemical requirements for the polymers above-mentioned there are two other physical properties of the polymer which must be observed before fibers spun from the polymers can achieve the remarkable properties of the fibers disclosed. The polymer must not melt at temperatures below about 200° C. which provides good fiber properties in many use applications without which other fibers having similar properties would not be useful.

In this respect polymers employed in the fiber reinforcing elements of this invention exhibit only slight changes in dynamic mechanical modulus (less than about 20 percent in Vibron determinations run at 11 cycles/second) in the range from 25° C. to 200° C. indicating excellent retention of properties over a wide temperature range. This characteristic differs greatly from that found in many other polymers and permits use of the fibers of the invention as composite reinforcements with a variety of fabrication techniques in which other organic reinforcing fibers would be degraded to the extent that their utility as reinforcing materials would be essentially negated.

Moreover, the polymers used to make the fibers used in this invention must have molecular weights high enough to reflect inherent viscosities of at least 3.5. It has been observed that polymers of the class mentioned above, even though corresponding to other essential requirements, do not provide fibers having the properties of the fibers used in this invention unless the inherent viscosities are greater than 3.5.

Even though the viscosities of the polymers necessarily employed in this invention are unusually high for formation of fibers, the average molecular weights of the rigid-chain polymers necessary to achieve such viscosities are quite low when compared to molecular weights of fiber forming polymers of the well known acrylic, polyolefin and aliphatic polyamide types. Thus, the number average molecular weights of the high viscosity polymers used in this invention may lie in the range of 50,000 to 100,000, for example, whereas fiber forming polyolefins characteristically possess molecular weights of much higher order.

As long as the linearity, the rigidity, the viscosities, the stability to heat up to 200° C. and chemical nature of the polymers are observed in accordance with the limitations described, the method of polymer preparation has not been found to be critical. Accordingly, the polymers may be prepared by any convenient means. Perhaps the most convenient means comprises solution polymerization of appropriate aromatic diisocyanates or diacid halides with essentially equimolar quantities of difunctional wholly aromatic monomers containing terminal —NH₂ radicals.

These reactions may conveniently be illustrated as follows:

wherein Ar and Ar' may be the same or different wholly aromatic, single or multiple ring, carbocyclic or heterocyclic residues and combinations thereof, R' and R'' may be the same or different divalent groups,

—NH— and combinations thereof, y and y' represent the same or different values 0 and 1, X is a halogen, preferably chlorine, n is a positive number and n' is a number representative of the number of repeat units in the polymer necessary to reflect an inherent viscosity of at least 3.5.

Sulfur may be used in the monomers where oxygen is indicated.

A representative polymer system which may be employed to illustrate the polymer, its preparation and spinning to form the novel and superior organic fibers used in this invention is an essentially linear wholly aromatic polyamide-hydrazide polymer which contains the alternating units characterized by the following formulas,

I and

II wherein Ar and Ar' represent the same or different divalent aromatic residues which must be a para oriented single ring, or a multiple or fused ring system containing a center of symmetry with respect to the extracyclic covalent bonding sites, or in the case of aromatic heterocyclic rings the extracyclic bonding must be such that the interlinear spacing is at a maximum distance. Such radicals, in addition to those already mentioned, include the following, wherein R may be radicals such as —NH—, and others hereinabove described, and combinations thereof.

Thus, the wholly aromatic polyamide hydrazide may be represented by repeating segments having the formula,

III wherein Ar and Ar' are above defined. The parentheses in Formula III connote the fact that the alternating units, I and II, may occur in head-to-head or head-to-tail fashion to the extent that the arrangement of repeating or alternating units may be such that the polymers range from wholly ordered polymers to polymers having no discernable order as is hereinafter described in greater detail.

In general the wholly aromatic polyamide hydrazides above-described may be prepared through polymerization reactions involving one or two steps. In the case of a two-step reaction, the first step involves the preparation of an amine terminated aromatic dihydrazide, represented by IV. The second step involves reaction of IV

IV with equimolar quantities of aromatic diacid halide. The product of a two-step reaction is an essentially wholly ordered polymer of regularly recurring segments which segments are represented by the following formula,

V

The term, essentially wholly ordered, as employed herein is intended to connote the orderly arrangement of molecules precisely as set forth in the repeating segment of Formula V and is intended to include those specific compositions which are characterized by such arrangement of molecules, even though an occasional Ar or Ar' group may be derived through the use of a mixture of essentially functionally equivalent monomers.

The one-step preparation of the wholly aromatic polyamide hydrazide may be achieved through the reaction of essentially equimolar quantities of an aromatic diacid halide and an aromatic aminohydrazide as depicted using p-aminobenzhydrazide and terephthaloyl chloride in the following reaction scheme:

2HCl   VI

Insofar as chemically unsymmetrical monomers such as p-aminobenzhydrazide can enter the polymer in either head-to-head or head-to-tail fashion, as mentioned earlier, no single repeat segment (represented by Formula V) is assured as in the case of the above-described two-stage reaction. Therefore, when referring to the arrangement of units of Formula II the parentheses employed, as in Formulas II and III and reaction VI indicate that such units may occur in reverse order with respect to any other such unit along the polymer chain. Thus, the polymers used to prepare the fibers employed in this invention may comprise one or more units having the formulas,

VII and

VIII

IX used in the sense of being polymer chain segments and not necessarily repeating segments or units so that as either x or y approaches 0 in Formula X,

X the polymer becomes a more ordered polymer (x and y are average numbers, including zero (the sum of x and y) being representative of the average sequence lengths of segments VII and VIII, respectively). As a general rule, it has been found that those reaction conditions which increase the degree to which the reaction is kinetically controlled will result in an increase in the order of the polymer produced, whereas, those conditions which increase the degree to which the reaction is diffusion controlled will result in decrease in the order of the polymer produced.

The above-described polyamide hydrazide polymers may be prepared through the use of known solution and interfacial techniques. However, since neither the intermediate dihydrazide diamine of Formula IV nor the final polymer of either the one-step or two-step preparation need be isolated prior to polymeriaztion or prior to the formation of fibers according to this invention, the solution polymerization technique is highly preferred.

Solution polymerization generally involves the dissolution of the dihydrazide diamine of Formula IV or the aromatic amino-hydrazide monomers in a suitable solvent which solvent is also a solvent for the aromatic diacid halide and the product polymer. Typical of such solvents are N,N-dimethylacetamide, N-methyl-2-pyrrolidone, hexamethylphosphoramide and mixtures of these and like solvents. In many instances, such solvents are rendered more effective by mixing them with small quantities, generally not more than about ten percent by weight, of a salt of an alkali or alkaline earth metal, such as lithium chloride, calcium chloride, magnesium bromide and the like. Preferred among such solvents for the polymerization is N,N-dimethylacetamide (DMAc), and especially DMAc containing a small amount of dissolved lithium chloride. To the solution of the dihydrazide diamine or aromatic amino-hydrazide reactant maintained at a temperature between −30° C. and 100° C., preferably between −20° C. and 35° C., the aromatic diacid halide is added as a solid, a liquid or as a solution. The reaction mixture should be stirred during addition of the aromatic diacid halide and until the reaction is substantially complete or until the desired viscosity is obtained. Hydrogen halide by-product should be neutralized upon completion of the polymerization reaction in order to reduce its corrosive effects on extrusion or other handling equipment. This may be accomplished by adding essentially stoichiometric quantities of materials such as lithium hydroxide, lithium carbonate, calcium carbonate, calcium acetate and the like.

Superior fiber reinforcing elements of this invention have been prepared employing wet spinning or a dry-jet wet spinning technique, the latter technique being where the solution of polymer is extruded from one or more orifices situated a short distance above the surface of a coagulation bath, into a gaseous atmosphere and then into the coagulation bath principally composed of water and a minor proportion of the solvent or solvents employed in the spinning solution to thereby coagulate the freshly extruded filament in gel form. The gel filament, resulting from either wet spinning or dry-jet wet spinning is thereafter washed to extract salts and solvent, wet-stretched, dried, optionally given a conventional textile antistatic and/or lubricant finish, optionally heat-stretched and packaged. Spinability of the aromatic polymers is excellent so long as the dopes remain gel-free. Where there is a tendency toward gross gelation or to form gelled particles in the dopes, particularly in dopes of high viscosities, the addition of small amounts of water serves to improve dope stability. Spinability of the high viscosity dopes required by the invention can be improved by mild heating to reduce viscosity. The polymer dopes are preferably, but not critically, held at temperatures between about 40° C. and 120° C., preferably from 60° C. and 90° C., and at polymer concentrations of from about 4 to 12 percent by weight of solids, both parameters depending primarily on the average molecular weight of the polymer as reflected by its inherent viscosity. Moreover, in dry-jet wet spinning operations the optimum distance of the jet face from the surface of the coagulation bath generally lies within the range of from about one-eighth to about one-half of an inch depending on viscosity, temperature and other conditions.

The versatility of fibers of the class of wholly aromatic polymers described herein can be realized principally through variation of polymer chemical orientation, viscosity and spinning conditions. To achieve maximum tensile properties, polymers having high or complete para orientation should be employed at rather high polymer viscosities and spun under conditions which minimize the spin orientation by minimizing the stretch during the coagulation and in a hot water cascade and thereafter thermally stretching the fiber under generally non-aqueous conditions to impart maximum stretch orientation and crystallinity.

More particularly, where fibers having modulus values exceeding those of the best glass fibers are desired, the polymers described in Formula III should be highly para oriented, thus the divalent residue Ar should be greater than 85 weight percent para oriented and Ar' should be at greater than 85 weight percent para oriented with any different orientation of the Ar' residue being essentially meta orientation. Quasi-para orientation occurs in the case of heterocyclic rings such as, where the orientation represents considerably greater maximum spacing than meta orientation and slightly less than para orientation at maximum possible distance for the particular radical. Therefore, in the consideration of chain rigidity of the polymers employed in the instant invention it will be observed that radicals possessing quasi-para orientation can occur considerably more frequently along the polymer chain than in the case of meta-oriented radicals without sacrifice of chain rigidity.

It has been found that the X-ray diffractions of high modulus fibers of polymers made from terephthaloyl chloride and p-aminobenzhydrazide are "collagen-like" with respect to the numerous orders of reflection in the longitudinal direction, indicating a high degree of regularity over long distances in the polymer chain. This is interpreted to mean that the polymer is not chainfolded but in the extended configuration. Such an interpretation is also consistent with electron diffraction data obtained on these polymers and their almost total lack of any low angle X-ray scattering. The high moduli of the fibers of the instant invention differ from fibers made from polymers which contain tetrahedral carbon atoms, meta-phenylenes, cyclohexane and similar ring structures, all of which contain chainfolding or a "zig-zag" array of chain units. Insofar as the fibers of this invention are in the fully extended state or nearly so, stress is to a large extent against the para-phenylene rings which can yield little under stress, thus, While the polymers useful in making the fibers used in this invention have been illustrated in great detail with respect to a given system for purposes of being concise, other polymers, for further example represented by the formulas, prepared by polycondensation of terephthaloyl halide with appropriate amines, can also be used to make the fibers described herein by spinning processes which result in high stretch orientation to result in fibers having densities greater than 1.37 as earlier indicated.

As earlier indicated, this invention is principally concerned with composites wherein synthetic fibers of a particular class are employed as a reinforcing phase to achieve properties comparable to and superior to properties exhibited by composites which employ "S" glass as the reinforcing phase. It has been discovered, however, that the reinforcing fibers herein described have a broader application in composite materials insofar as they can be employed in combination with different fibers, films, ribbons or particles to achieve an optimum balance of properties required by a given end use. For example, a polyester matrix may be reinforced with fibers of a wholly aromatic polyamide-hydrazide and further contain an additional discrete phase of fibers of "E" glass or "S" glass to achieve an optimum balance of properties. Still further, the use requirements may be such that the composite materials desirably possess tensile properties varying in different directions, in which case different forms of the wholly aromatic polymers can be employed alone or in combination with other reinforcing materials so as to provide, for example, a composite structure having maximum longitudinal tensile properties and moderate transverse tensile properties.

Composite materials of this invention provide a distinct advantage over many known composites insofar as the fibers of the above-described wholly aromatic organic fibers can be employed which possess tensile characteristics not heretofore achieved in organic fibers. The tensile properties of these composites can be made to exceed those of "S" glass reinforced resins in many composite constructions. Moreover, the unique reinforcing fibers of this invention have densities of about 58 percent of the density of "S" glass.

Low density of the reinforcing agent, of course, results in better tensile properties per unit weight of a composite material, which feature is a nearly universal goal for composite structures. Another distinct advantage results from the generally greater apparent affinity for resinous matrices by the aromatic polymers as reflected by the efficiency of the fiber as a reinforcing agent, a property not generally possessed by a glass reinforcing agent, the lack of which requires the use of expensive or sophisticated sizings or coupling agents. As above-indicated, the variety of use requirements necessitate tailoring composites to perform under a variety of conditions, and in addition to weight/performance advantages of the composites of this invention, the shapes and properties of the organic reinforcing agents may be readily varied to meet specific strength and structural characteristics required of the composite for a given utility. Moreover, the organic reinforcing materials of this invention are stable at moderately high temperatures and exhibit generally improved thermal properties over many organic fibers.

As initially set forth, the composite materials of the invention encompass a wide range of resinous materials as matrices. Such resins are generally known in the industry as thermoplastic and thermoset resins which materials are otherwise correspondingly known to form "rigid" and "semi-rigid" structural materials, although the latter classifications are not truly coextensive witht the former, for example, as in the case of rubber. The thermosetting and thermoplastic resins which are intended for use as matrix materials of this invention are commercially available in a wide range of formulations and properties so that the use to which a given composite material is to be put not only dictates the particular form and properties of the fiber reinforcing element, but also the formulation and properties of the resinous matrix.

The thermosetting resins which may be employed as matrix materials according to this invention include various epoxy resins, polyesters, phenolics, silicones, melamines, polybenzimidiazoles, polyimides, polyamide-hydrazides, polythiazoles as well as other known resins.

The thermosetting resins generally form three-dimensional networks upon curing to result in rigid structures. This feature lends great versatility in composite and structural fabrications in that the resins, in their uncured or partially cured forms, may be stored for prolonged periods, either with or without the wholly aromatic polymer reinforcing elements of this invention, prior to fabrication into rigid, tough, lightweight structures.

Epoxy resins are particularly useful as matrices for the composite structures of this invention because of their proven versatility, ease of handling, lower shrinkage, thermal stability, good adhesion and outstanding mechanical properties. Numerous epoxy resins, suitable for use in the preparation of reinforced resinous structures in accordance with this invention, are available commercially in a large variety of formulations varying in molecular— weight, cross-linking density, viscosity and chemical structure. These resins are commonly prepared by the base-induced condensation of polyhydroxy groups. These prepolymers usually range in molecular weight from about 400 to about 3,000, and in physical form vary from liquids having viscosities of between eight to twenty thousand centipoises to solids having melting points above 100° C.

One of the most commonly used types of epoxy resins are those obtained by the reaction of bisphenol-A with epichlorohydrin, to form diglycidyl ethers of bisphenol-A. Another type of epoxy resin, useful as a matrix material, is commonly prepared by the condensation, of a novolac resin (the reaction product of phenol and formaldehyde commonly called bisphenol-F) with epichlorohydrin. Because of the shorter distance between reactive epoxy groups in such resins, a tighter network structure and higher degree of cross-linking occurs on curing resulting in greater thermal stability, chemical resistance and elastic modulus. In addition to bisphenol-A and bisphenol-F other phenolic compounds which may be used to prepare epichlorohydrin resins include phenols such as catechol, resorcinol, hydroquinone, phloroglucinol, p,p'-dihydroxy diphenylsulfone, p,p'-dihydroxy benzophenone and the like. Still other types of epoxy resins which may be used as matrices in the composites of this invention are glycidyl ethers of aliphatic polyols such as glycerol, 2,5-bis (hydroxymethyl)tetrahydrofuran, 1,3 - bis(3-hydroxypropropyl)tetramethyldisiloxane. Glycidyl esters, glycidyl amides, and silicon glycidyl resins.

The epoxy resin prepolymers already mentioned may be cured or cross-linked in a variety of ways which usually involve either a ring-opening of the terminal epoxide groups, an esterification of the pendant hydroxyl groups or a combination of both. Among the curing agents which may be used with the epoxy resins are aliphatic amines, aromatic amines, amides, carboxylic acids and their anhydrides. The curing agents usually react with the resin and becomes a part of the network via covalent bonding. When tertiary amines are used, however, polymerization occurs by means of a catalytic ring-opening of the epoxy rings rather than by a simple addition reaction. Suitable curing agents, which may be used for cross-linking epoxy resins used in this invention are aromatic diamines such as m-phenylene diamine, 4,4'-methylenedianiline, and diaminodiphenyl sulfone; heterocyclic amines, such as pyridine, piperidine, N,N'-dimethyl piperazine, N-methyl morpholine and the like; aliphatic tertiary amines such as hexamethylene tetramine, triethylene diamine, dimethylamino propylamine and the like. Epoxy resins are generally stable for long periods of time in the absence of a curing agent. After adding a curing agent, the resin may be partially reacted or cured at room temperature or at elevated temperatures to form an intermediate or "B stage" resin, which although hard, is still soluble in some solvents. Curing to the final or highly cross-linked, insoluble thermoset form is effected by additional heating or more slowly on standing.

Unsaturated polymeric esters suitable for use in the preparation of the reinforced resinous structures in accordance with this invention are, as indicated above, those now being employed commercially, and are commonly prepared by condensing under polymerizing conditions, either (1) an ethylenically unsaturated dicarboxylic acid with a diol containing no ethylenic unsaturation, (2) a dicarboxylic acid containing no ethylenic unsaturation with an ethylenically unsaturated diol or, and most commonly, (3) a mixture of ethylenically unsaturated dicarboxylic acids, and dicarboxylic acids containing no ethylenic unsaturation with a diol containing no ethylenic unsaturation. Where stable dichlorides, diesters or anhydrides of the dicarboxylic acids are available, they may be substituted therefor. Among the ethylenically unsaturated dicarboxylic acids or derivatives thereof which are commonly employed may be mentioned fumaric acid, maleic acid and its anhydride, citraconic acid, mesaconic acid, itaconic acid and tetrahydrophthalic acid. Among the dicarboxylic acids or derivatives thereof containing no ethylenic unsaturation which are commonly employed may be mentioned phthalic acid and its anhydride, adipic acid, sebacic acid, isophthalic acid, terephthalic acid, malonic acid, succinic acid and glutaric acid. A frequently employed ethylenically unsaturated diol is 2-butene-1,4-diol, while among the commonly employed diols containing no ethylenic unsaturation may be mentioned ethylene glycol, propylene glycol, diethylene glycol and dipropylene glycol. As will be obvious to those skilled in the art, varying the proportions and nature of the ethylenically saturated and unsaturated reactants in these condensations affects the number of carbon-to-carbon double bonds in a given polymer chain length available for cross-linking by addition-polymerization means.

Among the addition-polymerization compounds most commonly employed as cross-linking agents in combination with the above-described polyesters in the manufacture of fiber-reinforced polymeric structures may be mentioned styrene, diallyl phthalate, methyl methacrylate and triallyl cyanurate. Other ethylenically unsaturated cross-linking agents more or less frequently employed in these operations include alpha-methylstyrene, divinyl benzene, vinyl toluene, allyl diglycolate, methyl acrylate, ethyl acrylate, ethyl methacrylate, vinyl acetate, acrylonitrile, diallyl maleate, vinyl pyenol and allyl carbamate. Frequently, more than one of the above cross-linking agents is employed in the same mixture, depending on the properties desired in the final structure and the use to which it will be put.

Thermoplastic resins generally include linear polymers which soften and flow, can be remelted and are additionally characterized by rather sharp melting points. Well known and widely used thermoplastic resins include the nylons, such as nylon 6 and nylon 66, polyethylenes, polypropylenes, polycarbonates, polyacetates, polystyrenes, polyvinyl chlorides and a variety of copolymers such as styrene/acrylonitrile, styrene/butadiene, ethylene/vinyl acetate and the like.

Fabrication of composite structures employing the resins and reinforcing fibers of the particular class of wholly aromatic polymers of this invention may be achieved according to any of the commonly employed techniques such as low pressure molding, cold forming, matched die molding, extrusion and filament winding and may include the fibers in short or continuous form or in the form of a fabric or felt.

The term ceramic is employed herein in the generally accepted sense and means those materials which are compounds of metallic and non-metallic elements. Like metals, ceramics have crystalline structures, but unlike metals the ceramic structures do not contain a large number of free electrons. In ceramic materials the electrons are either involved in covalent bonding or they are transferred to another atom to form ionic bonds. Thus, these materials are usually strong like metals, but poor conductors. A very wide variety of ceramic materials exist because of the many possible combinations of metallic and non-metallic atoms and because of the many structural arrangements which may exist for each such combination. Common in everyday use among such materials are glasses, cements, brick porcelains, plasters and the like. Cements of the portland cement type are particularly intended for use as matrix materials of this invention. They are, of course, generally comprised of a mixture of calcium aluminate and calcium silicate as the essential constituents and they may be employed as aggregates with sand or gravel in combination with the fiber reinforcement herein described. Plasters, including plaster of Paris, various other plasters useful for cast-in-place and precast units in the form of tile, sheathing, wall board and the like may similarly be fiber reinforced and indicated in this disclosure. The invention is useful in retarding crack propagation characteristics of a wide range of ceramic materials. Cracks appear to begin with small defects at crystal interfaces and propagate to such proportions that the structure composed of the ceramic is seriously weakened. The presence of the high modulus fibers of this invention serves to strengthen the overall structure principally by retarding crack propagation. While the fibers withstand low temperature curing of cement and ceramic greenware very well because of the pronounced insensitivity to water, the fiber reinforced composites of this invention cannot be fired.

Inherent viscosities of fiber described herein can be determined in any suitable polymer solvent such as N-methylpyrrolidone, dimethylacetamide, dimethylacetamide with lithium chloride, concentrated sulfuric acid, dimethylsulfoxide, hexamethylphosphoramide and the like generally as 0.5 percent solution of polymer at about 30° C. Similarly, viscosities can be determined at other concentrations where convenient, for example, 0.1 percent solutions can be employed.

Fiber densities as herein described are readily obtained by placing a fiber sample in a liquid having a density lower than that of the fiber sample and raising the density of the liquid by addition of another liquid having a density greater than that of the fiber sample until a liquid/fiber density equilibrium is achieved after which the density of the equilibrium density liquid can be accurately measured on a Fisher-Davidson Gravitometer. The term "density" used herein is intended to be synonymous with specific gravity.

Birefringence values reported herein were obtained using an Ehringhaus High Order Compensator.

The present invention is further illustrated by the following examples which are not intended to be limiting in any respect. In the examples, the fiber, tenacity, elongation and modulus values were obtained using an Instron Tester (Model No. TM) with a 1 inch gauge length and an extension rate of 100 percent per minute. The fiber samples were preconditioned at 65 percent relative humidity at 70° F. for 24 hours prior to testing, and then tested at these conditions. The data presented are generally the result of 5 breaks.

In the following examples, the prepaartion of all polymers was carried out under nitrogen. The polymer solutions were spun into a water bath at 20° C., containing 0–2 percent dimethylacetamide, unless stated otherwise. Spinning speeds were generally about 100′ per minute. Hot-drawing was carried out over a 12″ hot block with profile temperature.

EXAMPLE I

A clean, dry 3 liter resin kettle equipped with stirrer, gas inlet tube and drying tube was charged with 56.69 grams (0.375 m.) of para-aminobenzhydrazide (PABH) to which was added 1300 ml. of dry DMAc. PABH was rapidly and completely dissolved. The kettle temperature was adjusted to between −10 and −15° C. whereupon 76.136 grams (0.375 m.) of solid terephthaloyl chloride (TCl) was added with stirring to a powder funnel and the funnel was thereafter rinsed with 26 ml. of DMAc which rinse was added to the kettle. Upon completion of addition of TCl the stirrer speed was increased for about 5 min. and thereafter reduced for about an hour and 20 min. at which time external cooling was discontinued. After continued stirring for one-half hour, a slurry of 65.65 grams (99.5 mole percent of theory) of calcium acetate monohydrate, 13.5 ml. of water and 304 ml. of DMAc was added to the reaction mixture at ambient temperature. After one hour and 10 min. the reaction kettle was warmed to 70° C. for 1 hr. The reaction mixture was then degassed by vacuum and allowed to stand overnight to provide a polymer solution having a Brookfield viscosity at 23° C. of 7,000 poises.

The polymer thus prepared did not melt at temperatures up to 200° C., exhibited a specific viscosity of 0.867, and an inherent viscosity of 6.25 (0.1 g. in 100 ml. of DMSO at 30° C.)

The polymer solution thus prepared was spun into an aqueous coagulation bath from a 7 mil, 15 hole spinnerette situated ⅛ inch above the surface of the bath with calculated jet-stretch of 0.62X, washed without stretching in an aqueous cascade bath, dried at 150° C. on rolls and drawn over a hot shoe at 300° C. to provide a 2.13X hot stretch and thereafter collected on the bobbin. The fiber possessed the following properties:

Denier—0.64 d.p.f.
Tenacity—12.10 grams/denier
Single filament elongation-to-break—3.3%
Initial modulus—543 gms./denier
Density—1.425 gm./cm.$^3$
Birefringence—0.356

EXAMPLE II

A polyamide-hydrazide polymer (PAH) having an inherent viscosity of 4.72 measured as a 0.5 percent solution in DMSO at 30° C. prepared according to the method described in Example I was employed in DMAc solution containing 6 percent by weight of polymer solids and having a Brookfield viscosity of 1,600 poises at 24° C. The polymer solution was spun from a 6 mil, 15 hole spinnerette situated ⅛ inch above the surface of an aqueous coagulation bath into air and then into a coagulation bath. The gel state fibers were continuously removed from the coagulation bath and passed through a series of two aqueous cascade baths wherein they were given a 1.0X and 1.5X stretch, respectively, dried on heated rolls, passed over a shoe heat at 300° C. and thereafter taken up on bobbins. Four spinning runs were made employing portions of the same polymer solution under different drawing conditions as below indicated:

| Run | Jet stretch | Drier temperature, ° C. | Stretch over Shoe | Tenacity, g.p.d. | Elongation, percent | Initial modulus g.p.d. | D.p.f. |
|---|---|---|---|---|---|---|---|
| (a) | 0.65X | 100 | 1.23X | 11.2 | 4.5 | 493 | 9.68 |
| (b) | 2.09X | 150 | 1.23X | 12.0 | 3.7 | 541 | 2.86 |
| (c) | 2.09X | 150 | 1.65X | 12.6 | 2.4 | 630 | 2.08 |
| (d) | 2.09X | 150 | None | 7.8 | 13.5 | 284 | 3.47 |

EXAMPLE III 4.32 g. (0.01 m.) of the diamine, prepared from an excess of p-aminobenzhydrazide and terephthaloyl chloride, was dissolved in 70 ml. of DMAc containing 5 percent dissolved lithium chloride under nitrogen. The solution was cooled to −10° C. and 2.03 g. (0.01 m.) of terephthaloyl chloride was added. After 10 minutes, the clear viscous polymer solution which formed was warmed to room temperature, and an additional 20 ml. of DMAc with 5 percent dissolved LiCl was added. After stirring for 30 minutes at room temperature the dope was neutralized by the addition of 0.67 g. (90 percent of theory) Li$_2$CO$_3$ and 10 ml. DMAc. The 5 percent polymer dope was stirred at room temperature for 1 hour, at 50° C. for 30 min. and then at 80° C. for 20 min. The dope was then degassed under house vacuum for 10 minutes. The polymer had an inherent viscosity of 5.08 (0.5 percent in DMSO at 30° C.).

The polymer solution having a Brookfield viscosity of 24,000 poises was spun through a 5 mil., 10 hole jet, at a jet-stretch of 2.34, a cascade stretch of 1.14 and a dried temperature of 150° C. One sample of fiber (a) was hot-drawn 1.25X at 300° C., while a second sample (b) was not hot-drawn. Unaveraged single filament properties of these fiber samples are given in the following table.

| Sample | Denier (d.p.f.) | Tenacity (g.p.d.) | Elongation, percent | Initial modulus (g.p.d.) | Density | Birefringence |
|---|---|---|---|---|---|---|
| (a) | 2.69 | 10.9 | 2.7 | 590 | 1.47 | 0.455 |
| (b) | 3.48 | 8.50 | 12.0 | 323 | 1.44 | 0.421 |

EXAMPLE IV

Large scale preparation of a polyamide-hydrazide polymer from p-aminobenzhydrazide and terephthaloyl chloride using the one-step method.

A solution of 2741.4 g. (18.75 moles) of p-aminobenzhydrazide in 66.725 liters (139 lbs.) of dry dimethylacetamide was charged to a 30-gallon Pfaudler reactor and the solution cooled to −5° C. 3654.5 g. (18.0 moles) of solid terephthaloyl chloride was added with rapid stirring. Stirring was continued at a rapid rate for 45 minutes after completion of the addition of the terephthaloyl chloride, while circulating a coolant through the reactor jacket. The coolant circulation was then stopped. Stirring was continued at ambient temperature for one hour, with the rate being slowed as the dope viscosity increased. A slurry of 3171.2 g. (18.0 moles) of calcium acetate monohydrate, 653.4 g. of deionized water and 16.501 ml. (33.2 lbs.) of dimethylacetamide was prepared and added to the polymerization mixture. After adding the slurry, the polymer solution was stirred at ambient temperature for one hour and then heated to 70–75° C. by circulating a heat exchange medium at 85–95° C. through the reactor jacket (about 2.5 to 3 hours will usually be required to reach the temperature). When the temperature reaches 70–75° C., vacuum degassing of the polymer solution is started. After about 15 minutes the degassing was completed by the application of full vacuum for 5 minutes without stirring. The reactor was pressured with nitrogen and the polymer solution extruded under nitrogen pressure. The polymer solution of 6.16% solid content had an inherent viscosity of 6.14.

EXAMPLE V

A polyamide-hydrazide prepared in the manner described in Example IV was dissolved in DMAc to provide a polymer dope containing about 6 weight percent of polymer solids and having a Brookfield viscosity of 9,000 poises. The dope at 45° C. was pumped at a rate of 40.5 cc./min. through a spinnerette having an array of 90, 7 mil diameter orifices into air for a short distance and into an aqueous coagulation bath containing a minor proportion of DMAc. The coagulated filaments were continuously passed from the coagulation bath into a water cascade at 65° C. and thereafter dried on a first godet at 100° C. and a second godet at 150° C. The dried filaments were then heat stretched by passing them over a first shoe at 300° C. and a second hot shoe at 350° C. and thereafter taken-up. The stretching involved in the spinning process consisted of a 1.0X jet stretch during coagulation. 1.4X cascade stretch, 1.3X stretch on the first hot shoe and a 1.04X stretch on the second hot shoe. The collected fiber was characterized and exhibited the following properties:

Denier—6.26
Tenacity—14.3 grams/denier
Elongation (percent)—3.7
Modulus—594 grams/denier
Work-to-break (g./cm./den./cm.)—.33

The following results indicate the wide variety of properties obtainable from a given polymer solution, as a result of minor variations in the spinning conditions used.

| Sample | Tenacity, g.p.d. | Elongation, percent | Modulus, g.p.d. | Work to break g./cm./den./cm. |
|---|---|---|---|---|
| 1 | 7.9 | 8.8 | 242 | 0.572 |
| 2 | 4.8 | 40.9 | 104 | 1.944 |
| 3 | 6.3 | 15.5 | 208 | 0.864 |
| 4 | 12.2 | 3.7 | 440 | 0.330 |
| 5 | 15.0 | 3.5 | 570 | |

EXAMPLE VI

This example illustrates the preparation of filamentary composites by impregnating polyamide-hydrazide (PAH) and "S" glass yarns with epoxy resin followed by curing.

Yarn samples were impregnated by passing them through a bath containing an epoxy resin and m-phenylene diamine (MPDA) curing agent at a concentration of 14 phr. The MPDA was purified by sublimation at 70° C. at a vacuum of 0.3 to 0.9 mm. Hg before use. The impregnated yarn was cured for 2 hours at 85° C. followed by a 4 hour cure at 150° C. This cure schedule is relatively long and hot and therefore should give a satisfactory test for degradation of the fiber due to interaction with the epoxy resin.

The polyamide-hydrazide yarn, before impregnation, had the following single filament properties: Modulus, $13.9 \times 10^6$ p.s.i.; Strength, $240 \times 10^3$ p.s.i.; and Elongation, 2.8%. After impregnation and curing, the properties of those fibers in the composite were calculated from test results on materials using the rule of mixtures and the following values obtained: Modulus, $13.1 \times 10^6$ p.s.i.; Strength, $230 \times 10^3$ p.s.i.; and Elongation, 2.5%. These values demonstrate that the fiber properties were transferred with greater than 75% efficiency to the composite properties in accordance with the rule of mixtures. The impregnated and cured "S" glass yarn composite had the following fiber properties in the composite: Modulus, $10.3 \times 10^6$ p.s.i.; Strength, $496 \times 10^3$ p.s.i.; and Elongation <5%.

EXAMPLE VII

This example offers a comparison of certain properties of NOL ring composites prepared by the impregnation of polyamide-hydrazide and "S" glass yarns with epoxy resins and curing.

NOL rings were fabricated in accordance with ASTM D-2291-67 "Fabrication of Ring Test Specimens for Reinforced Plastics" using the procedure described in detail herein from two samples of polyamide-hydrazide yarn and one sample of "S" glass yarn. One sample of polyamide yarn was spun and redrawn, whereas the other sample was spun drawn. Three rings were prepared from each yarn sample and tested as follows:

(A) NOL ring diametric compression test

Values for the longitudinal Young's moduli of these composites were obtained by compressing NOL rings along a diameter between two parallel plates. Each ring was compressed and recompressed along two orthogonal diameters. The following formula based on simple beam theory and neglecting any anisotropic effects was used to calculate the modulus.

$$Ec = \frac{1.786}{b}\left(\frac{D+d^3}{2d}\right) dP/dH$$

wherein $Ec$=the longitudinal Young's modulus of the composite
$D$=inside diameter of NOL ring (inches)
$d$=thickness (inches)
$b$=width (inches)
$dP/dH$=change in load/change in head position The following values were determined:

| Sample | Ec (M si) | V | Ef (M si) |
|---|---|---|---|
| PAH (redrawn) | 6.7 | 0.66 | 9.8 |
| PAH (spun drawn) | 7.74 | 0.68 | 11.2 |
| S glass | 6.95 | 0.59 | 10.9 | wherein $Ef$ the longitudinal modulus of the fiber in the composite was calculated assuming that the rule of mixtures holds and that $Er=0.5$ M si. $Er$=longitudinal modulus of the resin matrix in the composite.

$V$=volume fraction of the fiber in the composite
M s.i.=p.s.i. $\times 10^6$ (B) NOL ring horizontal shear test The ASTM test, D-2344-65 T "Apparent Horizontal Shear Strength of Reinforced Plastics by Short Beam Method" was used to give a rough measure of the degree of adhesion between the samples and an epoxy resin.

A polyamide-hydrazide composite having a fiber volume fraction of 68% with no surface treatment or finish gave a horizontal shear strength ($Sh$) of 8 k.s.i.; whereas a comparable "S" glass sample, which contained a special finish had a horizontal shear strength of 9.9 k.s.i. A horizontal shear value of less than 3 k.s.i. would normally be obtained for the corresponding "S" glass composite in which no finish or coupling agent was used on the glass fiber.

EXAMPLE VIII

This example shows a comparison of polyamide-hydrazide composites and comparable "S" glass composites with respect to important "in-use" properties. In actual practice, unidirectional composites are seldom used because the transverse and shear properties are too low. In order to compensate for this, quasi-isotropic laminated composites, consisting of several layers of unidirectional plates, positioned such that the fibers are oriented at random angles, may be prepared. If the in-use forces or deflections to which the composite is subjected are anisotropic, then for maximum efficiency, the composite component resisting those forces should be anisotropic to the same degree; whereas, if the forces or deflections are isotropic then the composite component should also be isotropic. In order to compare the polyamide-hydrazide fiber of this invention to "S" glass fiber for use as a reinforcing medium in composites, both quasi-isotropic laminated composites as well as unidirectional composites should be considered.

The values in the table below allow a comparison of polyamide-hydrazide composites with "S" glass composites at different volume fractions. The longitudinal modulus ($E_{11}$) and transverse modulus ($E_{22}$) values were determined experimentally. The quasi-isotropic properties were calculated using Tsai's equations.

| Material | Density, lb./in.$^3$ | $E_{11}$ | $E_{22}$ | E | G | $\hat{E}_{11}$ | E | $\hat{G}$ |
|---|---|---|---|---|---|---|---|---|
| PAH | 0.0527 | 13.9 | 0.5 | | | 26.4 | | |
| S Glass | 0.0890 | 12.5 | 12.5 | | | 13.9 | | |
| Epoxy | 0.0433 | 0.5 | 0.5 | | | 1.15 | | |
| 67% PAH | 0.050 | 9.5 | 0.5 | 3.9 | 1.3 | 19.0 | 7.7 | 2.6 |
| 67% S Glass | 0.073 | 8.5 | 2.2 | 4.5 | 1.6 | 11.4 | 5.1 | 2.1 |
| 50% PAH | 0.048 | 7.2 | 0.5 | 3.0 | 1.0 | 15.0 | 6.3 | 2.2 |
| 50% S Glass | 0.066 | 6.5 | 1.4 | 3.3 | 1.2 | 9.8 | 5.0 | 1.75 |
| 33% PAH | 0.046 | 4.9 | 0.5 | 2.16 | 0.74 | 10.6 | 4.6 | 1.60 |
| 33% S Glass | 0.059 | 4.4 | 1.02 | 2.33 | 0.79 | 7.6 | 3.9 | 1.35 | wherein $E_{11}$ = longitudinal modulus
$E_{22}$ = transverse modulus
$G$ = shear modulus $\bar{E}$ and $\bar{G}$ are quasi-isotropic longitudinal and shear modulus values and $\wedge$ signifies specific property i.e. property divided by density. Tsai's equations are:

isotropic Young's modulus $\bar{E} = \tfrac{3}{8}E_{11} + \tfrac{5}{8}E_{22}$
(stiffness)

isotropic shear modulus $\bar{G} = \tfrac{1}{8}E_{11} + \tfrac{1}{4}E_{22}$
(rigidity)

The advantage factor [1] of PAH composites over "S" glass composites at various loading factors is indicated by the following data

|  | $\hat{E}_{11}$ | $\hat{E}_{22}$ | $\hat{\bar{E}}$ | $\hat{\bar{G}}$ | $ds/d_{PAH}$ |
|---|---|---|---|---|---|
| 67 | 1.67 | 0.36 | 1.28 | 1.27 | 1.48 |
| 50 | 1.54 | 0.65 | 1.27 | 1.22 | 1.37 |
| 33 | 1.47 | 0.62 | 1.17 | 1.15 | 1.28 | wherein $ds/d_{PAH}$ = ratio of the density of the "S" glass composite to that of the PAH composite.

From the above results, it can be seen, with respect to stiffness, that on a specific basis that polyamide-hydrazide composites are about 30% better in Young's modulus and 25% better in shear modulus than glass composites in quasi-isotropic laminates at 50% volume fraction. Further, the polyamide-hydrazide reinforced unidirectional composites are about 65% higher in Young's modulus at 67% fiber volume than the corresponding "S" glass composites.

This example illustrates the preparation of unidirectional plates from polyamide-hydrazide yarns impregnated with epoxy resins.

Unidirectional plate composites were fabricated by wet winding polyamide-hydrazide yarns onto a rectangular plate, consisting of a 1/8" x 4" x 4" aluminum plate, to

EXAMPLE IX which were fastened, at top and bottom, smooth (chrome plated) plates coated with mold release. The two layers of fiber were coated with resin and pressed between two smooth (chrome plated) plates, using spacers to control the thickness (1/8") and width (dimension perpendicular to the fiber axis) allowing the excess resin to flow out along the fiber direction.

After curing, 1/8" x 1/2" x 3" bars were cut from the polyamide-hydrazide unilayers with the fiber axis at 0° to the longitudinal axis of the bar. The fiber volume fraction of these samples was 50%.

The Young's modulus of the composite (Ec) was 6M s.i. and that of the fiber (Ef) was 12M s.i.

[1] Advantage factor = $\dfrac{\text{Mod. PAH/Mod. S Glass}}{d_{PAH}/ds} = \dfrac{\hat{E}_{11}PAH}{\hat{E}_{11}S}$

EXAMPLE X

This example illustrates the preparation of composites from polyester resin and polyamide-hydrazide fibers.

(A) Impregnated yarns

Impregnated yarns were prepared from polyamide-hydrazide fiber and polyester resins as described in Example VI. Tensile properties, based on the fiber area and neglecting the resin contribution to the force were as follows: Fiber tensile strength 247 (k.s.i.) fiber modulus 15.3 (M. si.)

(B) NOL rings

NOL rings were prepared in the manner described previously and the results obtained for the properties of the composite at a fiber volume fraction of about 67% were as follows:

Composite tensile strength 129 (k.s.i.)
Composite longitudinal modulus 7.1 (M. si.)

EXAMPLE XI

These examples illustrate the preparation of composite bodies from a phenol-formaldehyde thermoset resin matrix with polyamide-hydrazide and "S" glass fibers.

Continuous polyamide-hydrazide filaments were pulled through a bath of phenol-formaldehyde resin, passed between neoprene squeeze rolls and wound on an open frame. The coated filaments were "B staged" for 10 minutes at 100° C. The "B staged" resin content of the coated fibers was determined to be approximately 22% and its volatile content 3.5%. Twenty plies of coated roving were charged to a 1/2" x 4" open end mold. The cold mold was placed in a cold press at 200 p.s.i. The press was heated to 225° F., maintained at this temperature for 30 minutes, and then heated to 325° F. The pressure was then raised to 500 p.s.i. and the sample cured under these conditions for one hour. At the end of this time, the press was cooled to room temperature, the sample removed from the mold, cut to final size and tested.

(B) The above experiment was repeated in exactly the same manner, with the exception that "S" glass fibers were used.

The composites above were tested with the following results:

| Reinforcement | Density | Fiber content, vol. percent | Flexure strength/ modulus (p.s.i.) | Short beam shear strength (p.s.i.) | Impact [1] notched Izod |
|---|---|---|---|---|---|
| S Glass | 2.35 | 68.0 | 61,000/7.5×10⁶ | 2,600 | 32 |
| Polyamide-hydrazide | 1.55 | 72.5 | 77,500/6.8×10⁶ | 6,500 | 28 |

[1] Foot lb./inch notch.

EXAMPLE XII

These examples illustrate the preparation of composite bodies from a melamine-formaldehyde thermoset resin matrix with polyamide-hydrazide and "S" glass fibers.

A 60% aqueous melamine-formaldehyde resin solution was prepared. Fiber rovings were dipped in this solution and then aligned by winding on a drum. The coated fiber was then given a "B stage" cure by heating in an air circulating oven for 5 minutes at 100° C. The treated roving had a volatile content of approximately 4% and a resin content of approximately 22%. The fibers were then hot pressed in a 1/2" x 1/4" open end mold for 15 minutes at 100 p.s.i. and 225° F., followed by 60 minutes at 200 p.s.i. and 325° F. The mold was cooled in the press, after which the specimen was removed, cut to dimensions and tested.

(B) The above experiment was repeated in exactly the same manner, with the exception that "S" glass fibers were used.

On testing the above composites, the following results were obtained:

| Reinforcement | Density | Fiber content, vol. percent | Flexure strength/ modulus (p.s.i.) | Short beam shear strength (p.s.i.) | Impact notched Izod |
|---|---|---|---|---|---|
| S Glass | 2.22 | 72.7 | 130,000/8.8×10⁶ | 5,300 | 41 |
| Polyamide-hydrazide | 1.55 | 71.0 | 90,000/8.2×10⁶ | 6,600 | 20 |

EXAMPLE XIII

These examples illustrate the preparation of composite bodies from aromatic polyimide and aromatic polyimide prepolymer thermoset resin matrices with polyamide-hydrazide fibers.

Polyamide-hydrazide filaments were passed through a bath containing a 25% solution of an aromatic polyimide resin and wound on an open frame rack. The coated filaments were "B staged" for 30 minutes at 120° C. in an oven, after which treatment the resin content was determined to be 17% and the volatile content 10%. The roving was then placed in a ½" x 4" open end mold. The mold was placed in a hot press for 5 minutes at 500° F. and 15 p.s.i. The pressure was then released momentarily and then raised to 100 p.s.i., the temperature being maintained at 500° F. and cured under these conditions for one hour. The mold was then cooled in the press, the sample unroved, cut to dimensions and tested.

(B) The above experiment was repeated in exact detail, with the exception that an aromatic polyimide prepolymer resin matrix was used.

On testing these samples, the following results were obtained:

| Matrix | Fiber content, vol. percent | Flexure strength/ modulus (p.s.i.) | Short beam shear strength (p.s.i.) |
|---|---|---|---|
| Polyimide | 72.5 | 70,000/6.0×10⁶ | 5,300 |
| Polyimide prepolymer | 69.0 | 66,500/5.7×10⁶ | 4,800 |

EXAMPLE XIV

These examples illustrate the preparation of composites prepared from thermoplastic resin matrices with polyamidehydrazide and "S" glass fibers.

Continuous filament fibers (either polyamide-hydrazide or "S" glass) were passed through a wire coating extrusion die and coated with ethylene/vinyl acetate (82/13) copolymer, low density polyethylene and polypropylene resins. Extrusion temperatures used were 300° F. for the ethylene/vinyl acetate, 350° F. for the polyethylene and 400° F. for the polypropylene resins. The coated rope was cooled by passing through a water bath, air dried and placed on a spool. The amount of fiber fed into the extruder was adjusted so that the composites would be of approximately the same composition on a volume basis. The various ropes were then cut to ⅜" to ½" lengths and re-extruded to form a rope. Extrusion head temperatures ranged from about 325° F. for the ethylene vinyl acetate copolymer resin to about 400° F. for the polypropylene polymer. The extrusion head temperature was adjusted for each sample so as to obtain a satisfactory flow rate and minimize thermal degradation. The composites were then cooled in air, chopped to ¼" lengths and the extrusion process repeated. Following this third extrusion, the material was chopped into ¼" pellets and used to injection mold test bars.

Molding conditions used were as follows:

| Specimen | Composition | Pressure (p.s.i.) | Temp. (° F.) |
|---|---|---|---|
| A | E/VA (ethylene vinylacetate) | 300 | 250 |
| B | E/VA—S glass | 400 | 250 |
| C | E/VA—Polyamide-hydrazide | 400 | 250 |
| D | Polyethylene (PE) | 300 | 250 |
| E | P.E.—S glass | 500 | 250 |
| F | P.E.—Polyamide-hydrazide | 500 | 250 |
| G | Polypropylene (PP) | 400 | 400 |
| H | P.P.—S glass | 400 | 400 |
| I | P.P.—Polyamide-hydrazide | 400 | 400 |

The speciments above were tested for flexural strength and modulus at room temperature and impact by the notched (Izod test) with the following results:

| Specimen | Density | Fiber [1] content, vol. percent | Room temperature flexure Strength (p.s.i.) | Modulus (p.s.i.) | Impact [2] notched Izod |
|---|---|---|---|---|---|
| A | 0.935 |  | 320 | 6,600 | 3.7 |
| B | 1.052 | 7.45 | 2,100 | 81,300 | 7.7 |
| C | 0.977 | 8.25 | 1,300 | 59,000 | 7.6 |
| D | 0.891 |  | 810 | 22,000 | 10.9 |
| E | 1.008 | 7.14 | 3,000 | 179,000 | 4.6 |
| F | 0.921 | 7.38 | 2,300 | 178,000 | 7.4 |
| G | 0.921 |  | 6,500 | 178,000 | 0.4 |
| H | 1.040 | 7.48 | 12,700 | 652,000 | 4.9 |
| I | 0.955 | 6.56 | 8,100 | 489,000 | 1.4 |

[1] Polyamide-hydrazide recovered by xylene extraction.
[2] Foot lb./inch notch. All values average of 5 individual determination

EXAMPLE XV

This example illustrates the use of discontinuous fibers, derived from polyamide-hydrazide polymers for the purpose of reinforcing concrete.

Continuous filament fibers, produced as described in Example V, were cut to about 1" staple length. The discontinuous fiber was mixed with coarse aggregate in a tumble type mixer and then fine aggregate, cement and water added in that order. After mixing thoroughly, the material was fabricated into the desired shaped articles, by conventional techniques (such as by molding into bars) and cured by standard procedures. A loading of about 5 percent by weight was used. A preferred concrete mix for these fiber reinforced specimens was found to be cement (5-7 bgs./yd.³); water—0.50-0.65 p.p.s. by wt. of cement; sand—65% of aggregate; coarse aggregate—35% of ⅜" aggregate, and air—about 5-10% by absolute volume.

EXAMPLE XVI

A polyamide-hydrazide yarn, prepared in a manner similar to that described in Example V and having a tenacity of 12.5 g.p.d., an elongation of 2.7% and a tensile modulus ($M_1$) of 701 g.p.d., was mechanically twisted (type Z twist) to 0.65 t.p.i. (turns per inch).

The yarn was then woven into a satin fabric having 56 ends/inch the warp and 54 picks/inch in the fill direction. The fabric was designed to duplicate on a fiber volume basis the type fiber glass fabric construction currently used in laminate structures. A comparison of the tensile data of the glass fabric with that of the polyamide-hydrazide fabric is given in Table I.

TABLE I

| | Density (fabric), oz./yd.² | Break strength, lbs./in. | | Spec. strength, lbs./in./oz./yd.² | | Break elongation, percent | | Initial modulus, lbs./in./oz./yd.² | |
|---|---|---|---|---|---|---|---|---|---|
| | | W | F | W | F | W | F | W | F |
| PAH | 5.3 | 432 | 512 | 81.1 | 97.0 | 3.1 | 3.71 | 2,834 | 2,737 |
| Fiberglass | 8.65 | 433 | 354 | 50.2 | 40.8 | 3.68 | 3.32 | 1,354 | 1,199 |

Note.—Wherein: W=warp, F=fill.

The data are average of 5 tests; Instron breaks, 5 in. gauge length 100% extensiion/min. Fiber density: PAH =1.51; E glass, 2.55.

The fabric was impregnated with epoxy resin and cured using standard procedures for glass epoxy laminates.

The composite had the following properties:

Mod. (M. s.i.):                                  Strength (k.s.i.)
  Tensile 4.0 _______________________ 52
  Short beam shear _______________ [1] 4.3(5:1)

[1] Span length to thickness of tested samples.

The composite structure had a density of 1.34 gms./cc. and a specific modulus of 82.6×10⁶ inches.

In high performance fiber reinforced composite materials, the major function of the matrix is to transfer forces imposed on the composite to the reinforcing fibers, which bear the major portion of the load.

In order to withstand high loads and increase the efficiency of the reinforcement in the composite, the modulus of the fiber should be at least twice that of the matrix, and preferably 300% or greater. Further, as the volume fraction of the fiber approaches a maximum value, the load bearing capacity of the composite also approaches a maximum. Theoretically, using circular fibers of equal diameter a maximum volume of about 90% can be obtained however, the composite properties usually reach an optimum value at about an 80% volume fraction and begin to decrease with increased loadings from this point. A finite space between fibers is necessary in order for the matrix to penetrate and coat each fiber. At higher loading, the difficulty of eliminating voids is also increased. When round fibers are used, it has been found that fiber loadings (volume fractions) of the order of 65–75% are generally preferable with respect to ease of fabrication and handling. Higher loadings and correspondingly better composite properties may be attained by using ribbons and other cross-section, rather than circular fibers, due to the increased packing efficiency. In most composite applications herein described the reinforcing fiber may range in denier normal to higher than those deniers commonly used in the textile industry. Thus, deniers generally ranging from about ½ denier per fiber to 100 may be employed, although generally deniers ranging from about ½ to 20 appear to be optimum for most uses herein contemplated. The length of the fiber reinforcing elements employed herein range from about ten times the fiber diameter in discontinuous or short fibers up to continuous filaments.

The excellent longitudinal (Young's) modulus and modulus to weight ratios attained by the fiber reinforced resins of this invention result from the fact that the modulus of the fiber ($E_f$)/modulus of the matrix ($E_m$) values are of the order of 20–25 for most matrices in combination with the high efficiency values of these composites. It has been found that at fiber volume fractions ($V_f$) of less than about 20%, these fibers will carry 70% or better of the composite load.

For some end uses, fiber volume fractions of less than 50% may be desirable. However, for most practical applications, the volume fraction should exceed 50%.

On the other hand, where highly flexible structures are desired fiber reinforcement may be as low as 5 volume percent, so that depending on the properties and end uses desired the volume fraction of the reinforcing phase of this invention may range from 5–90 volume percent.

As previously mentioned and illustrated in the foregoing examples, the modulus/elongation relationship of the fibers of this invention is quite varied, ranging from extraordinarily high moduli values at elongations up to about 4 percent to high moduli, glass-like fibers at moderate elongations greater than about 4 percent. Generally, with a given rigid chain polymer, the maximum attainable moduli values are most readily obtained through the use of a polymer having an inherent viscosity of greater than about 4. In order to obtain fibers of this type high viscosity polymers should be spun in such a manner as to minimize the orientation engendered by extrusion and coagulation and maximize the stretch orientation through a balance of cascade and hot stretches. Spin orientation is effected by the chemical nature of the polymer, its inherent viscosity, the polymer solids content of the dope, the orifice size, pumping rates, jet stretch and bath concentration and temperature. Generally, spin orientation for a given polymer solution increases with decreasing orifice size, increasing rate of extrusion and increasing inherent viscosity of the polymer and can be controlled through the judicial use of such variables. Although the hot stretch is not critical to all polymer systems it is generally highly desirable to achieve the best high moduli properties. These high modulus fibers have moduli greater than about 500 grams per denier at elongations less than 4 percent and are ideally suited to replace or be used in combination with inorganic reinforcing agents in composite structures requiring extremely high longitudinal tensile properties. Other composite structures require reinforcing elements having high impact strengths and are generally not available through the use of glass fibers. Here, the fibers of this invention having elongation values of from about 4 to 15 percent coupled with moduli ranging upward from about 210 fill a technological gap and allow for the provision of lightweight, high modulus, high impact resistant structures.

The fibers of this invention can be used as composite reinforcing elements in a wide range of structural design where engineering and esthetics demand high modulus per unit weight and high moisture resistance. This includes structures such as aircraft wing coverings, various struts, beams and pull rods, automatic bodies, boat hulls, skis, body armor, helmets, contour furniture and the like. The fiber reinforcements can be used in the form of continuous filament tow, chopped filament, woven and non-woven fabrics.

We claim:

1. In a composite structure comprised of a resin matrix and from about 5 to about 90 volume percent of a fiber reinforcing element, the improvement comprising said fiber reinforcing element having a specific density of at least 1.37, single filament elongation-to-break ($E_b$) ranging from 2.0 to 15 percent and an initial modulus in grams per denier greater than the value, $1000(E_b^{-0.508})$, and being composed of an organic polymer having a melting point above 200° C. represented by the following formula wherein Ar and Ar' represent aromatic carbocyclic residues, aromatic heterocyclic residues and combinations thereof which must be at least about 85 weight percent para-oriented, have a plane of symmetry or be linked by ring atoms representing the maximum spacing, any extracyclic bonding within said aromatic residues being through a radical selected from the group consisting of NH, —N=N— and combinations thereof, R' and R" are radicals selected from the group consisting of $$-\overset{O}{\underset{\|}{C}}-,\ -\overset{S}{\underset{\|}{C}}-$$

—NH— and combinations thereof, $y$ and $y'$ are the values 0 or 1 and $n'$ is a number large enough to provide a polymer having an inherent viscosity of at least 3.5.

2. The composite structure of claim 1 wherein the fiber reinforcing element is embedded in the matrix as a continuous filament.

3. The composite structure of claim 1 wherein said fiber reinforcing element is embedded in the matrix in the form of a short fiber.

4. The composite structure of claim 1 in which the fiber reinforcing element is embedded in the matrix in the form of a fabric.

5. The composite structure of claim 1 wherein the resinous matrix is a thermoplastic resin.

6. The composite structure of claim 1 wherein the resinous matrix is a thermosetting resin.

7. The composite structure of claim 6 wherein the thermosetting resin is an epoxy resin.

8. The composite structure of claim 6 wherein the thermosetting resin is a polyester resin.

9. The composite structure of claim 1 wherein said fiber reinforcing element is composed of a polymer consisting essentially of recurring para-oriented phenylene rings interlinked through 1 or more of the groups $$-\overset{O}{\underset{\|}{C}}-,\ \overset{S}{\underset{\|}{C}}$$

NH and —N=N— and combinations thereof.

10. The composite structure of claim 9 wherein the fiber reinforcing element is represented by the formula:

$$-\left[NH-\bigcirc-\overset{O}{\underset{\|}{C}}-NH-\bigcirc-NH-\overset{O}{\underset{\|}{C}}-\bigcirc-NH-\overset{O}{\underset{\|}{C}}-\bigcirc-\overset{O}{\underset{\|}{C}}-\right]_{n'}$$

wherein $n'$ is a number representative of the number of repeat units necessary to achieve the inherent viscosity of greater than 3.5.

11. The composite structure of claim 9 wherein the fiber reinforcing element is composed of the polymer represented by the formula:

$$-\left[NH-\bigcirc-NH-\overset{O}{\underset{\|}{C}}-\bigcirc-NH-\overset{O}{\underset{\|}{C}}-\bigcirc-\overset{O}{\underset{\|}{C}}-\right]_{n'}$$

wherein $n'$ is the number representative for the number of repeat units required to achieve the inherent viscosity of greater than 3.5.

12. The composite structure of claim 9 wherein the fiber reinforcing element is composed of a polymer represented by the following formula:

$$-\left[\left(NH-\bigcirc-\overset{O}{\underset{\|}{C}}-NH-NH-\right)\overset{O}{\underset{\|}{C}}-\bigcirc-\overset{O}{\underset{\|}{C}}-\right]_{n'}$$

wherein $n'$ is a number representative of the number of repeat units required to achieve an inherent viscosity of greater than 3.5.

13. The composite structure of claim 12 wherein the reinforcing fiber element is a wholly para-oriented polymer.

14. In a composite structure comprised of a ceramic matrix and from about 5 to about 90 volume percent of a fiber reinforcing element, the improvement comprising said fiber reinforcing element having a specific density of at least 1.37, single filament elongation-to-break ($E_b$) ranging from 2.0 to 15 percent and an initial modulus in grams per denier greater than the value, $1000(E_b^{-0.58})$, and being composed of an organic polymer having a melting point above 200° C., represented by the following formula $$-\left[NH-\left(R'\right)_y-Ar-\left(R''\right)_{y'}-NH-\overset{O}{\underset{\|}{C}}-Ar'-\overset{O}{\underset{\|}{C}}-\right]_{n'}$$

wherein Ar and Ar' represent aromatic carbocyclic residues, aromatic heterocyclic residues and combinations thereof which must be at least about 85 weight percent para-oriented, have a plane of symmetry or be linked by ring atoms representing the maximum spacing, any extracyclic bonding within said aromatic residues being through a radical selected from the group consisting of $$-\overset{O}{\underset{\|}{C}}-,\ -\overset{S}{\underset{\|}{C}}-$$

—NH—, —N=N— and combinations thereof, R' and R" are radicals selected from the group consisting of $$-\overset{O}{\underset{\|}{C}}-,\ -\overset{S}{\underset{\|}{C}}-$$

—NH— and combinations thereof, $y$ and $y'$ are the values 0 or 1 and $n'$ is a number large enough to provide a polymer having an inherent viscosity of at least 3.5.

15. The composite structure of claim 14 wherein the fiber reinforcing element is embedded in the matrix as a continuous filament.

16. The composite structure of claim 14 wherein said fiber reinforcing element is embedded in the matrix in the form of a short fiber.

17. The composite structure of claim 14 in which the fiber reinforcing element is embedded in the matrix in the form of a fabric.

18. The composite structure of claim 14 wherein the ceramic matrix is a cement.

19. The composite structure of claim 14 wherein the ceramic matrix is a plaster.

20. The composite structure of claim 14 wherein said fiber reinforcing element is composed of a polymer consisting essentially of recurring para-oriented phenylene rings interlinked through 1 or more of the groups $$-\overset{O}{\underset{\|}{C}}-,\ \overset{S}{\underset{\|}{C}}$$

NH and —N=N— and combinations thereof.

21. The composite structure of claim 20 wherein the fiber reinforcing element is represented by the formula:

$$-\left[NH-\bigcirc-\overset{O}{\underset{\|}{C}}-NH-\bigcirc-NH-\overset{O}{\underset{\|}{C}}-\bigcirc-NH-\overset{O}{\underset{\|}{C}}-\bigcirc-\overset{O}{\underset{\|}{C}}-\right]_{n'}$$

wherein $n'$ is a number representative of the number of repeat units necessary to achieve the inherent viscosity of greater than 3.5.

22. The composite structure of claim 20 wherein the fiber reinforcing element is composed of the polymer represented by the formula:

$$-\left[NH-\bigcirc-NH-\overset{O}{\underset{\|}{C}}-\bigcirc-NH-\overset{O}{\underset{\|}{C}}-\bigcirc-\overset{O}{\underset{\|}{C}}-\right]_{n'}$$

wherein $n'$ is the number representative for the number of repeat units required to achieve the inherent viscosity of greater than 3.5.

23. The composite structure of claim 20 wherein the fiber reinforcing element is composed of a polymer represented by the following formula:

$$-\left[\left(NH-\bigcirc-\overset{O}{\underset{\|}{C}}-NH-NH-\right)\overset{O}{\underset{\|}{C}}-\bigcirc-\overset{O}{\underset{\|}{C}}-\right]_{n'}$$

wherein $n'$ is a number representative of the number of repeat units required to achieve an inherent viscosity of greater than 3.5.

24. The composite structure of claim 23 wherein the reinforcing fiber element is a wholly para-oriented polymer.

25. A composite structure comprising a resinous epoxy matrix having embedded therein as a discrete phase from about 5 to 90 volume percent of a fiber of an aromatic polyamide hydrazide having the formula:

wherein $n'$ is a number representative of the number of repeat units required to achieve an inherent viscosity of greater than 3.5, said polymer having a melting point above 200° C., said fiber reinforcing element having a specific density of at least 1.37, a single filament elongation-to-break ranging from 2 to 15 percent and initial modulus in grams per denier greater than the value, 1000 $(E_b^{-0.58})$.

26. A composite structure comprising a resinous polyester matrix having embedded therein as a discrete phase from about 5 to 90 volume percent of a fiber of an aromatic polyamide-hydrazide having the formula:

wherein $n$ is a number representative of the number of repeat units required to achieve an inherent viscosity of greater than 3.5, said polymer having a melting point above 200° C., said fiber reinforced element having a specific density of at least 1.37, a single filament elongation-to-break ranging from 2 to 15 percent and an initial modulus in grams per denier greater than the value, 1000 $(E_b^{-0.58})$.

References Cited
UNITED STATES PATENTS

| | | | |
|---|---|---|---|
| 2,188,332 | 1/1940 | Carothers | 161—227X |
| 2,244,184 | 6/1941 | Austin | 260—849 |
| 2,349,290 | 5/1944 | Loughborough | 117—7 |
| 2,516,585 | 7/1950 | Pease | 260—78 |
| 2,794,760 | 6/1957 | Wilson | 161—194X |
| 2,949,394 | 8/1960 | Rodman | 161—227X |
| 3,133,825 | 5/1964 | Rubens | 161—195X |
| 3,218,222 | 11/1965 | Skeen et al. | 161—227X |
| 3,491,055 | 1/1970 | Talley | 161—169X |

HAROLD ANSHER, Primary Examiner

U.S. Cl. X.R.

161—184, 227, 231

UNITED STATES PATENT OFFICE
CERTIFICATE OF CORRECTION

Patent No. 3,600,269      Dated August 17, 1971

Inventor(s) Brian K. Daniels, Jack Preston and David A. Zaukelies

It is certified that error appears in the above-identified patent and that said Letters Patent are hereby corrected as shown below:

Column 3, lines 10-11, the right-hand formula should appear as follows:

Column 4, lines 46 and 53, the right-hand end of the diamine should appear as follows:

Column 4, lines 49 and 58, the diamino portion of the repeating unit should appear as follows:

Column 6, lines 38 through 40, --or-- has been omitted between formulas numbered "VIII" and "IX".

Column 22, line 57, "0.508" should read --0.58--.

Signed and sealed this 21st day of March 1972.

(SEAL)
Attest:

EDWARD M. FLETCHER, JR.　　　　ROBERT GOTTSCHALK
Attesting Officer　　　　　　　　Commissioner of Patents